(No Model.)
J. W. BLAKE.
BARBED WIRE FOR FENCES.
No. 446,607. Patented Feb. 17, 1891.
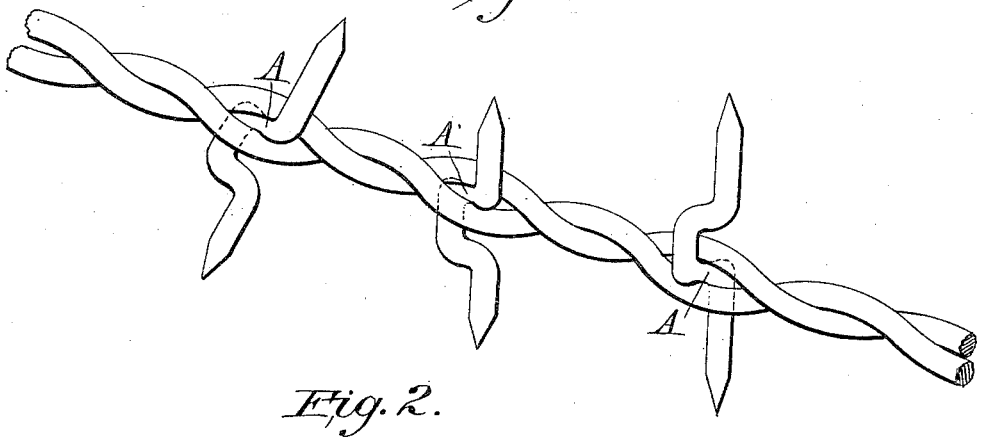
Fig. 1.
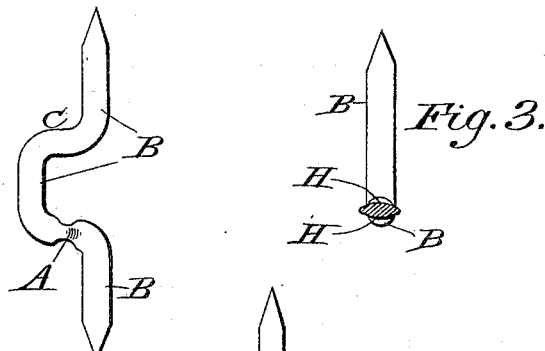
Fig. 2.      Fig. 3.
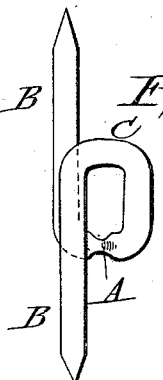
Fig. 4.
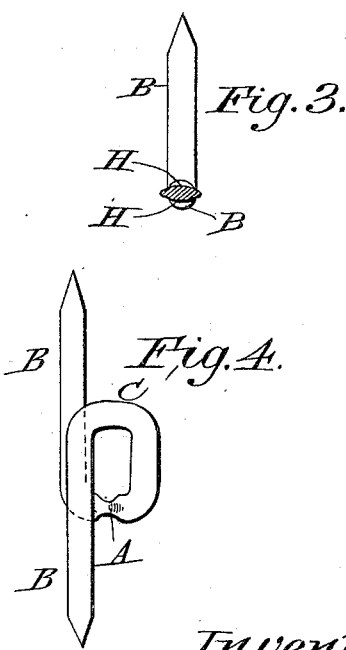
Witnesses:
John S. Renninger
Frank N. Sickler
Inventor:
John W. Blake

UNITED STATES PATENT OFFICE.

JOHN W. BLAKE, OF MARSHALL, MINNESOTA.

BARBED WIRE FOR FENCES.

SPECIFICATION forming part of Letters Patent No. 446,607, dated February 17, 1891.

Application filed July 8, 1889. Serial No. 316,879. (No model.)

*To all whom it may concern:*

Be it known that I, JOHN W. BLAKE, a citizen of the United States, residing at Marshall, in the county of Lyon and State of Minnesota, have invented a new and useful Improvement in Barbed Wire for Fence Purposes, of which the following is a specification.

In order to make plain the usefulness of my invention I call attention to the fact that the use of barbed wire for fence purposes as now manufactured is the frequent cause of the injury and death of domestic animals, and also that serious injury sometimes occurs to the human kind therefrom. I also call attention to the fact that such harm is usually incurred by the animal or person coming violently and unintentionally in contact with such barbed wire from an angle of direction less than a right angle to the line of fence, which impels such animal or person to slide along the wire some distance, whereby such wire is practically converted into a saw, each barb acting as a tooth, lacerating, tearing, and cutting the person or animal until their forward motion has ceased. Again, animals sometimes get a foot or limb over a barbed wire and, unable to escape, they draw back and forth, unable to release themselves, and not infrequently saw themselves nearly or quite in two.

The object of my invention is to provide a barbed wire for fence purposes so composed and manufactured that it will protect against and turn animals of all kinds equally as well as the barbed wire now made, yet will not cause loss of life or limb or other great injury when a person or animal comes in violent contact with it from dangerous angles of direction.

To make plain the most essential and important part of my invention, I call attention to the fact that when two or more wires are cable laid or twisted together, as is usually done in the manufacture of barbed-wire fencing, the wires have a strong and permanent tendency to spring closely together and that any body inserted between them will be quite firmly clasped and held therein.

Having explained the object and usefulness of my invention and noted the important principle that I utilize—*i. e.*, the tendency of cable-laid wires to spring together—I will now explain my proposed improvement in the manufacture of barbed wire for fence purposes.

I use a cable-laid wire of two or more strands and insert between the strands at proper intervals barbs having certain essential shapes and forms, viz: Whatever other shapes or forms the barb may have, it is essential—

Frst. That the cross-section of the part that is in contact with and clasped between the strands of the wire be of or nearly approach an ellipse in shape, with a marked difference between the less and larger diameters. A proportion of about two to one between such diameters is a good one. Figure 3 of the drawings herewith shows cross-section of barb at point held by the wire; but I distinctly state that the cross-section as shown is not absolutely necessary to the purpose of my invention, but that it is absolutely necessary that such cross-section have a greater and less diameter, for the purpose that when the barb clasped by the wire is partly turned on its center from its less to its larger diameter the strands of the wire will be slightly forced apart, and for the purpose that when the barb is relieved from the pressure on its projecting part that caused it to turn, it, influenced by the springing together of the strands of the wire, will immediately resume its normal position.

Second. It is also essential that the barb, after passing clear from its embrace within the wire, as aforedescribed, shall be turned, formed, or shaped so that the projecting portion, or a considerable part thereof, shall be at or nearly at right angle to the part held in the wire and parallel, or nearly so, with the shortest diameter of such part. The object and necessity of this are to furnish leverage, so that a body in violent moving contact with the outer ends of the barb from any direction other than at right angles to the line of the wire will cause the barb to turn from its less toward its larger diameter. Such shaping will also prevent the barb from dropping or being pushed out from its proper position. The effect will be the same whether the projecting parts of the barb be turned in the same or in opposite directions to each other.

Third. It is also essential that some part of one or more of the projecting portions of the barb be so turned, shaped, or formed that when attacked by a moving body it will not turn quite flat or parallel with the sides of the main wire, as in that case the barb might be caught on the dead-center of the largest diameter of its elliptical part and not return to normal position when relieved from pressure.

Figs. 2 and 4 show good forms of barbs, both of them having the essential features hereinbefore described. It is evident many other shapes may be partly adapted, and I do not claim any particular form of barb as my invention, except in the particular shapes, features, and characteristics herein set forth as essential. To manufacture such barbs, wire drawn throughout to a cross-section adapted to the purpose of the portion held in the main wire would be best; but wire or metals of other shapes may by dies or stamps readily be given proper forms for the purpose.

In use a fence constructed of barbed wire, as I propose, will turn animals as well as that now used, as the barbs firmly clasped by the spring of the wires will present sufficient discomfort and pain to prevent animals from easing themselves against or intentionally attacking it. If violently attacked at or nearly at right angles, it will present the same opposition as barbed wire now made, having equal length of barb. If violently attacked from any dangerous direction—i. e., from any angle appreciably less than a right angle—the barbs, as quickly as pressure comes upon them, will successively turn nearly flat or parallel with the main wire, thus withdrawing their lacerating-points and permit the attacking body to slide with little or no injury along the wire, whereupon, impelled by the natural closing of the wires upon the peculiar shape of their clasped part, they will immediately resume normal position.

Referring to the drawings herewith, Fig. 1 shows a section of cable-laid wire with barbs A A A, having the features essential to my invention, inserted between the strands and fairly represents my invention. Figs. 2 and 4 show barbs having the features essential to my invention; A, the portion in contact with and clasped by the strands of the main wire; B B, the projecting portions of the barb, turned in direction hereinbefore set forth as necessary; C, a part of one of the projecting portions bent so as to engage the main wire at a proper point to prevent the barb under pressure being turned onto the dead-center of the longest diameter of its elliptical part. Fig. 3 shows cross-section of the elliptical part A of the barb.

I am aware that cable-laid wire with inserted barbs is in general use for fence purposes, and I do not broadly claim such as my invention; but What I do claim, and desire to secure by Letters Patent, is—

1. A barb with substantially a U-shaped or loop-formed central portion and adapted to be held transversely between the strands of a cable-laid wire, the part clasped being elliptical in cross-section, the said barb having its projecting parts parallel to the minor axis of the ellipse and also adapted to yield to pressure as well as to return to its normal position when relieved, substantially as described.

2. In combination with a cable-laid wire, a barb having a U-shaped or loop-formed central portion and adapted to be held transversely between the strands of the cable, the part clasped being elliptical in cross-section, the said barb having its projecting parts parallel to the minor axis of the ellipse and adapted to yield to pressure as well as to return to its normal position when relieved, substantially as described.

JOHN W. BLAKE.

Witnesses:
L. LARSON,
L. B. NICHULS.